(12) United States Patent
Find et al.

(10) Patent No.: US 9,851,143 B2
(45) Date of Patent: Dec. 26, 2017

(54) HIGH PRESSURE RECOVERY OF CARBON DIOXIDE FROM A FERMENTATION PROCESS

(75) Inventors: Rasmus Find, Vejle (DK); Jan Flensted Poulsen, Vorbasse (DK)

(73) Assignee: Union Engineering A/S, Fredericia (DK)

(*) Notice: Subject to any disclaimer, the term of this patent is extended or adjusted under 35 U.S.C. 154(b) by 235 days.

(21) Appl. No.: 13/807,138

(22) PCT Filed: Jul. 1, 2011

(86) PCT No.: PCT/DK2011/050258
§ 371 (c)(1),
(2), (4) Date: Feb. 14, 2013

(87) PCT Pub. No.: WO2012/000520
PCT Pub. Date: Jan. 5, 2012

(65) Prior Publication Data
US 2013/0133363 A1    May 30, 2013

(30) Foreign Application Priority Data

Jul. 2, 2010    (DK) ................................ 2010 70314

(51) Int. Cl.
| | | |
|---|---|---|
| *F25J 3/08* | (2006.01) | |
| *B01D 53/78* | (2006.01) | |
| *B01D 53/14* | (2006.01) | |

(52) U.S. Cl.
CPC ............ *F25J 3/08* (2013.01); *B01D 53/1475* (2013.01); *B01D 53/78* (2013.01); *B01D 2256/22* (2013.01); *Y02C 10/06* (2013.01)

(58) Field of Classification Search
CPC .............. B01D 53/1475; B01D 53/78; B01D 2256/22; F25J 3/08; Y02C 10/06
USPC .... 95/183, 228, 236, 239, 242; 62/617, 928; 426/7
See application file for complete search history.

(56) References Cited

U.S. PATENT DOCUMENTS

| | | | | |
|---|---|---|---|---|
| 3,317,278 | A | * | 5/1967 | Ruhemann et al. ........ 423/437.1 |
| 3,751,878 | A | * | 8/1973 | Collins ........................... 95/105 |
| 4,009,575 | A | * | 3/1977 | Hartman, Jr. ............. F01K 5/02 |
| | | | | 126/263.01 |
| 4,054,431 | A | * | 10/1977 | Kotcharian ..................... 95/192 |

(Continued)

FOREIGN PATENT DOCUMENTS

| | | | |
|---|---|---|---|
| EP | 0194795 | A2 | 9/1986 |
| EP | 1319911 | A1 * | 6/2003 ................. F25J 3/02 |

(Continued)

OTHER PUBLICATIONS

Paul Horsley, "Secondary Refrigerant Systems", Apr. 20, 2009, Accessed Nov. 28, 2014, All Pages https://web.archive.org/web/20090420141344/http://cool-info.co.uk/brines_steam/secondary_refrigerants/sec_refrig01.html.*

(Continued)

*Primary Examiner* — Amber R Orlando
*Assistant Examiner* — Britanny Precht
(74) *Attorney, Agent, or Firm* — Quarles & Brady LLP

(57) ABSTRACT

The present invention relates to a method for recovering carbon dioxide from a gaseous stream originating from a fermentation process by compression, absorption, condensation and distillation, wherein at least the absorption and condensation is performed under a high pressure of at least 30 bar.

23 Claims, 6 Drawing Sheets

(56) References Cited

U.S. PATENT DOCUMENTS

| | | | | |
|---|---|---|---|---|
| 4,206,237 | A | * | 6/1980 | Sakata et al. .................. 426/16 |
| 4,346,563 | A | * | 8/1982 | Hood .............................. 62/117 |
| 4,363,654 | A | * | 12/1982 | Frederick ................. C01B 3/36 |
| | | | | 75/493 |
| 4,699,642 | A | * | 10/1987 | Perry et al. ..................... 62/541 |
| 4,733,528 | A | * | 3/1988 | Pinto ....................... C01B 3/025 |
| | | | | 252/376 |
| 4,995,234 | A | * | 2/1991 | Kooy ..................... F01K 25/10 |
| | | | | 60/648 |
| 5,234,472 | A | * | 8/1993 | Krishnamurthy et al. ....... 95/98 |
| 6,174,506 | B1 | * | 1/2001 | Chakravarti et al. ......... 423/220 |
| 6,321,565 | B1 | * | 11/2001 | Kihara et al. .................. 62/643 |
| 6,461,583 | B1 | * | 10/2002 | Hayashida et al. ........... 423/579 |
| 2008/0173585 | A1 | * | 7/2008 | White ................. B01D 53/002 |
| | | | | 210/656 |
| 2008/0302133 | A1 | | 12/2008 | Saysset et al. |
| 2010/0101231 | A1 | * | 4/2010 | Westmeier ............. F01K 23/10 |
| | | | | 60/783 |
| 2010/0278711 | A1 | * | 11/2010 | Find .................. B01D 19/0015 |
| | | | | 423/437.1 |
| 2013/0091853 | A1 | * | 4/2013 | Denton et al. .................. 60/772 |
| 2013/0118171 | A1 | * | 5/2013 | Milam .................... F01K 25/08 |
| | | | | 60/671 |
| 2014/0301929 | A1 | * | 10/2014 | Wang et al. ................. 423/228 |

FOREIGN PATENT DOCUMENTS

| | | |
|---|---|---|
| JP | 04-240101 A | 8/1992 |
| JP | 11-028081 A | 2/1999 |
| JP | 2009-520595 A | 5/2009 |
| WO | 2009127217 A1 | 10/2009 |
| WO | 2011157268 A1 | 12/2011 |

OTHER PUBLICATIONS

Praxair, "Typical Carbon Dioxide Tank and Supply System", Oct. 15, 2009, Accessed Nov. 28, 2014, p. 25 http://catalogs.praxairdirect.com/i/27114/31.*

* cited by examiner

HIGH PRESSURE RECOVERY OF CARBON DIOXIDE FROM A FERMENTATION PROCESS

FIELD

The present invention relates to a method for recovering carbon dioxide from a gaseous stream originating from a fermentation process or a bottling line, by compression, absorption, condensation and distillation, wherein the method is performed under high pressure.

BACKGROUND

A preferred way of carbonating beverages, such as brewed products, is by purifying carbon dioxide on site. Therefore, carbon dioxide streams originating from a fermentation process, such as in a brewery, are often purified and returned to the brewery. Thus, the carbon dioxide generated by the fermentation process is used again in the brewed drink or other carbonated beverages produced at the same site as the fermentation process, is used as a so-called cover gas in the bottlery to prevent entrainment of air or to displace air.

Presently the most commonly used method comprises the steps of: defoaming; washing in a water scrubber; compressing; filtrating through a carbon filter; dehydrating; reboiling and distilling the carbon dioxide stream in order to provide the purified carbon dioxide stream. This method effectively purifies carbon dioxide with a satisfactory yield and purity, but several elements of the process add to the cost of the overall recovery process. First of all, the water used in the water scrubber must be disposed of, moreover the carbon filters and dehydrators must be regenerated routinely, and finally external power must be supplied to the method. The large amount of unit operations in the method requires means for maintaining the pressure over the entire system. Generally, the more unit operations comprised in a system the larger the pressure drop and hence the costs for maintaining the same.

Moreover, the conventional final liquefaction of carbon dioxide requires substantive energy supply. The condensation is typically performed by an ammonia cooled condenser. Also, the liquid carbon dioxide produced must be stored in a storage tank and has to be re-evaporated before being used as cover gas or as carbon dioxide for carbonating the beverages. In the conventional method the system is operated at a pressure of approximately 16 bar corresponding to the pressure of a standard carbon dioxide storage tank in which liquid carbon dioxide is stored before being used.

Operating at—in this context—low pressure is the conventional way in the field for recovering high purity carbon dioxide in food grade quality, mainly because this has been considered most economical for several reasons, such as the purity obtained and the cost of installation.

However, operating at lower pressures requires a very high degree of water removal, as the presence of water in the system will cause problems with the formation of ice or gas hydrates. In addition, condensation of the purified carbon dioxide to provide liquefied carbon dioxide requires a high energy input.

The issue of condensation has been addressed in EP 0194795 A2 wherein a recovery process is described in which impure carbon dioxide from a brewing plant is pressurized and cooled, producing a substantially pure carbon dioxide liquid stream and a stream of gaseous impurities, i.e. non-condensable gases. This is followed by expansion of the pure carbon dioxide liquid stream to provide a liquid and gaseous pure carbon dioxide stream, whereby the liquid carbon dioxide provided is used to liquefy the gaseous stream of the initial compression step. Thus, this method provides a solution in which cooling and liquefaction of carbon dioxide is effected by the expansion and evaporation of substantially pure liquid carbon dioxide. Thereby, internal heat transfer and/or cooling power is utilized to supply energy for a purification step. It is stated that this process reduces the specific and overall power consumption and the heat required for vaporization. However, only when the liquefied carbon dioxide is fully employed and expanded will the method be fully economical. Therefore, this method still requires a large energy input for the condensing of the carbon dioxide. The present invention is a method in which one or more of the above problems of the prior art have been solved.

SUMMARY

Thus, in a first aspect the present invention provides a method for recovering carbon dioxide from a gaseous carbon dioxide stream originating from a fermentation process, the method comprises the steps of a) providing the carbon dioxide stream originating from the fermentation process; b) compressing the provided stream by at least one compressing step providing a compressed gaseous stream; c) subjecting the compressed gaseous stream to an absorption step providing at least a carbon dioxide rich gaseous stream; d) condensing the carbon dioxide rich gaseous stream in a condenser providing at least a condensate and purge gas; and e) distilling the condensate to provide purified carbon dioxide, wherein the pressure of the compressed carbon dioxide stream obtained in step b) is at least 30 bar, the temperature is within a range where there is substantially no condensation of carbon dioxide and that said pressure is maintained to at least step d).

With the present invention it has now been found that when the pressure is at least 30 bar, the gas can subsequently be condensed using fluids, such as those used in the bottlery or in the fermentation process, whereby the energy used at the start of the process is more than regained at a later stage of the process namely in the liquefaction of the pure carbon dioxide which is normally one of the most energy consuming parts of the recovery process.

The method of the present invention has several advantages.

When the pressure in the system is high, the normal water scrubber is replaced with a high pressure water scrubber or a carbon dioxide scrubber. This will reduce the amount of water necessary to obtain the desired purity as well as the amount of contaminated water to be cleaned and disposed. Moreover, the condensation following the absorption step does not require the low temperatures around −30° C. which are normally necessary in order to condense carbon dioxide when present at 15-20 bar. Thus, according to the invention the temperature of the condensing liquid, hereinafter the coolant, may be around zero or just below, such as −10 to 10° C., preferably −8° C. to −3° C., for example −5° C. As the temperature of the coolant can be relatively high compared to traditional $CO_2$ plants, it was found that it is possible to use for example brine normally used in breweries for cooling fermentation tanks etc., and consequently, the coolant is already available in the plant. The brine is preferably any aqueous mixture which lowers the freezing point of water. Examples are aqueous solutions of glycols and salts. Where ambient temperatures are low, $CO_2$ condensation by air cooling is also an option.

One of the main benefits of the present invention is that it is possible to utilize a coolant having a temperature around −10° C. to 10° C. to cool carbon dioxide to under −24° C., reducing the specific energy consumption for the produced amount of carbon dioxide enormously.

Another advantage of the present invention is that the amount of water used in the overall process may be further reduced. The water solubility of many impurities is controlled by the partial pressure of that specific impurity. If a solution is an ideal solution and the concentration of the respective impurities is low, the solubility will be directly proportional to the partial pressure. Thus, if the pressure is doubled the solubility is also doubled. Therefore, when the water solubility increases, due to the increased pressure, the water content may be reduced proportionally to obtain the same degree of purification.

In yet another embodiment liquefied carbon dioxide may be re-evaporated by being contacted with the warmer coolant, e.g. brine, taken from the brewery. This re-evaporated carbon dioxide may then be used for example in the bottlery line. Hereby the temperature of the coolant decreases from e.g. −5° C. to −8° C. This cooled brine is in a particularly preferred embodiment used as the coolant in the condensing step, whereby the temperature of the coolant will increase typically to the initial temperature of the brine and can be used again in the brewery as such.

Thereby, the system is neutral in respect of condensing and re-evaporation energy solving many problems of the prior art.

The energy required for the compression may be optimized by inserting several sequential compression steps, for example 2 or 3. 2 or 3 compression steps are presently preferred as the most economical number in a combined installation and operations perspective.

Finally, when transferring the condensed and distilled carbon dioxide to the storage tank in which the carbon dioxide will almost always be stored at a pressure lower than the condensing pressure, typically at around 16 bar which is standard in the industry, 20% gaseous carbon dioxide will form due to this difference in pressure (if depressurized from e.g. 35 bar). This gaseous carbon dioxide may be transferred directly to the fermentation plant, brewery and/or bottlery as a cover gas or be used in the bottles or cans for carbonating the beverages, preferably beer.

When the formed gaseous carbon dioxide is transferred directly to the brewery, the energy consumption of the overall method will be additionally reduced, and in a particular embodiment where the pressure is reduced from approximately 35 to 16 bar, with up to around additional 10%.

Means for control of the carbon dioxide may be provided for ensuring that the excess gaseous carbon dioxide has the required purity before entering the fermentation plant, brewery and/or bottlery.

In another embodiment the gaseous carbon dioxide formed when transferred to the storage tank is returned to the at least one compressor and is subjected to another purification step. Alternatively, the excess gas is conditioned and distilled again or condensed and transferred to the storage tank. In a particular embodiment this condensation is performed using brine comprising glycol as a coolant or by using the cooling power of re-evaporating liquid carbon dioxide.

The absorption may be performed in a high pressure water scrubber or a carbon dioxide scrubber. When using a high pressure water scrubber the amount of water to be used is substantially reduced compared to water scrubbing under lower pressures normally used in the industry, i.e. close to ambient pressure. When doubling the pressure water consumption can typically be halved. In addition, the subsequent dehydrating step in, e.g. a filter and regeneration thereof will require less carbon dioxide for the regeneration, approximately from normally 3% to less than 1.5%, and consequently the overall yield is increased.

When the absorbent is water the method preferably also comprises a dehydrating step for removing water that may cause problems with ice and gas hydrate formation further downstream, such as in the condenser or distillation column system.

In a presently preferred embodiment the absorption step is a carbon dioxide scrubber step. When using a carbon dioxide scrubber, the yield of carbon dioxide will increase relative to the use of a water scrubber because carbon dioxide will be absorbed in the water, when used as the absorbent, resulting in a loss of carbon dioxide. In addition, when the carbon dioxide scrubber comprises integrated dehydration means, such as ethanol from the fermentation process, water will be removed during the carbon dioxide scrubber step. Thus, a drying filter is unnecessary, as any water present will be removed in the carbon dioxide scrubber. Consequently, the regeneration of the filter, normally consuming approximately 3% of the carbon dioxide stream, is avoided also resulting in a higher yield.

Another advantage of using a carbon dioxide scrubber is that fewer components are required for the entire purification which saves installations costs. Fewer components in the overall process also means that the pressure drop is less pronounced, and consequently less energy is required to maintain the pressure in the system.

In another preferred embodiment the at least one compressor is a lubricated compressor such as an oil or water lubricated compressor, more specifically an oil lubricated screw compressor.

Such compressors are less costly, easy to adjust capacity-wise and adapt to the conditions of the process. Moreover, they are easy to maintain and very reliable.

Non-lubricated piston-compressors are the conventional choice of compressors. Lubrication fluids, such as oil, are highly undesired in carbon dioxide intended for consumption and there is reluctance in the field to replace the conventional compressors with these cheaper, lubricated compressors. The problem could be solved by inserting a filter between the at least one compression step and the absorption step. However, the quality of the product would highly depend on the operation of the filter, this being the only means for removing the lubricant that will inevitably be admixed with the carbon dioxide stream. However, when the absorption step is a carbon dioxide scrubber step, the lubricating oil is effectively removed therein and the provision of a filter may be omitted or serve as an extra precaution and/or a means for collecting lubricant to be returned to the compressors. This will reduce the amount of lubricant used as well as ensure the quality of the product.

Thus, in a presently preferred embodiment the absorbent is liquid carbon dioxide and the at least one compressor is a lubricated compressor. This will save cost on installation as well as during operation with a higher yield without compromising the purity.

The specific pressure of the method of the invention has now been found to effectuate that the carbon dioxide can be effectively condensed using a cooling fluid typically available at the point of origin of the carbon dioxide stream. By these findings the otherwise high expenses of increasing the pressure upstream in the process are more than regained in the overall process. Thus, the pressure is partially based on the temperature of the coolant available from fermentation process as well as the composition of the contaminant lean carbon dioxide stream leaving the purification step. The inventor has also observed that with increasing purity of the stream to be condensed, higher temperatures of the coolant, at a given pressure, are sufficient. In one preferred embodiment the temperature of the fluid is −5° C., and the pressure is at least 35 bar, this combination will ensure a high yield having a high degree of purity.

In yet another embodiment liquid carbon dioxide from the storage tank is re-evaporated for use in the brewery. The re-evaporation is performed by the coolant either before being used as coolant in the condensing step or by the warmer coolant after condensation. Both alternatives are energy neutral. Particularly, preferred is the alternative where the coolant is used before being used in the condensing step, as this will provide a coolant having a lower temperature which allows for a lower pressure and/or degree of purity of the stream to be condensed.

In another embodiment the pressure is reduced after the condensing step d), and the distillation of step e) is performed at the reduced pressure. This embodiment has the advantage that less coolant needs to be used to condense the carbon dioxide. Instead, air or water can be used to cool the stream upstream in the process. It is preferred that the reduced pressure at which the distillation occurs is the industry standard for storing carbon dioxide, which is typically around 15-18 bar, preferably 16 bar.

In still another embodiment the method further comprises a step f) of subjecting the gaseous stream obtained in step d) to a combined condensing and re-evaporation step, wherein the re-evaporation is performed at a lower pressure than the pressure of the gaseous stream obtained in step d), preferably a standard pressure applied in the industry for storage of carbon dioxide, such as approximately 15 to 18 bar, preferably approximately 16 bar. In this embodiment the volume of the purge gas which is otherwise discharged is dramatically reduced. Thereby the total yield of carbon dioxide is increased. The pressure is typically released by inserting a valve.

In an aspect or embodiment of the first aspect is provided a method for re-evaporating liquid carbon dioxide, for example obtained by the methods described above, to provide a gaseous carbon dioxide stream for use in a production in need of gaseous carbon dioxide, comprising the steps of a) providing liquid carbon dioxide for example from a source selected from a storage tank, distilled carbon dioxide from a distillation unit or condensed carbon dioxide from a condensing unit; b) evaporating the liquid carbon dioxide in a heat exchanging means to provide a gaseous heated carbon dioxide stream; c) expanding the gaseous heated carbon dioxide stream to provide an expanded gaseous heated carbon dioxide stream; and d) heating the expanded gaseous heated carbon dioxide stream to provide a gaseous carbon dioxide stream for use in a production in need of gaseous carbon dioxide. This method is a power saving way of re-evaporating liquid carbon dioxide for any suitable purpose.

The effects and advantages will be further illustrated by the detailed embodiments described below. These are illustrative and the invention should not be limited to these alone.

DETAILED DESCRIPTION

Figure 1:
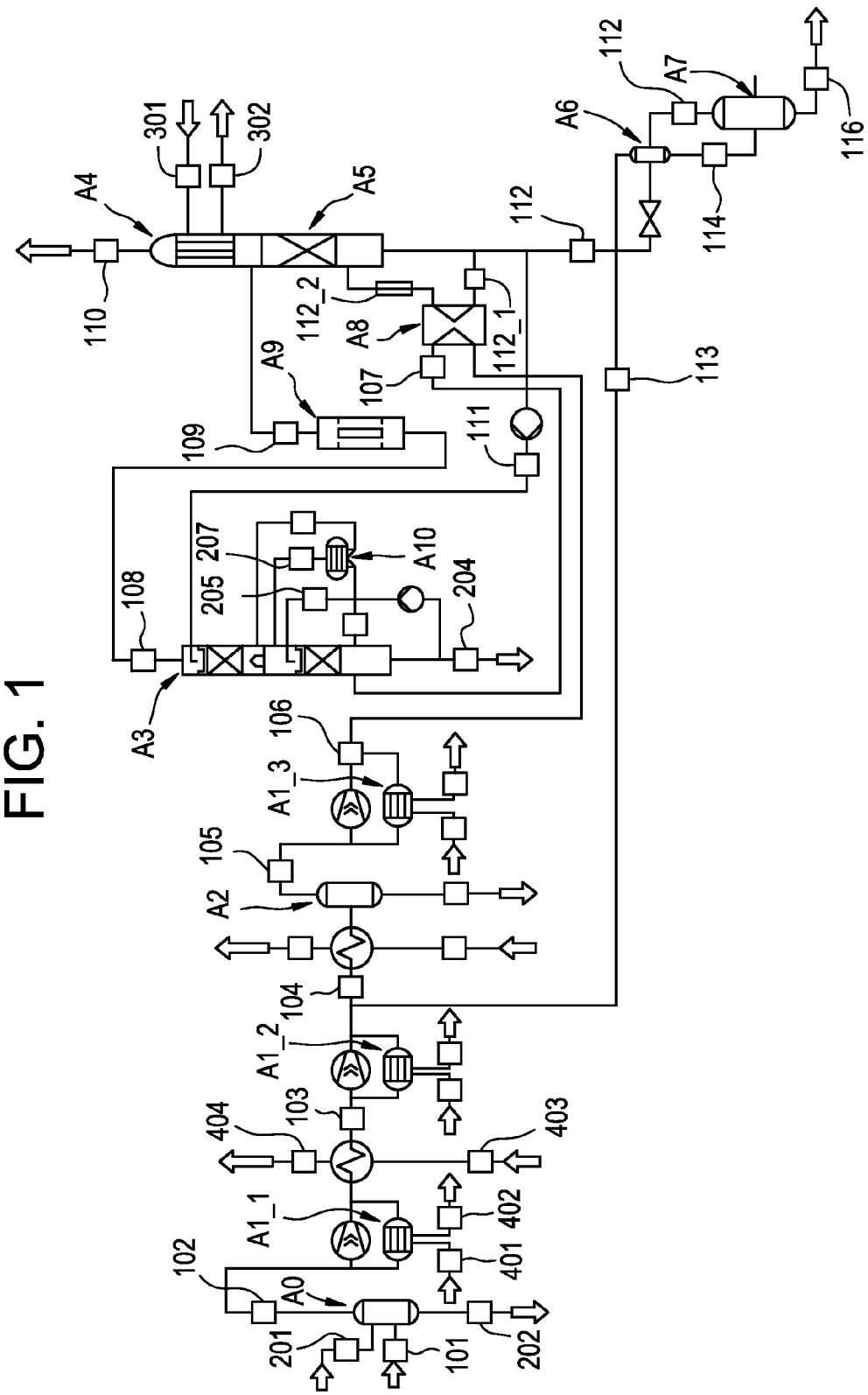
FIG. 1 is a detailed overview of an embodiment of the process according to the invention.

For illustrative purposes the components and streams referred to in the detailed description of the invention and the drawings are summarized below.

Foam trap A0; first, second and third compressors A1_1, A1_2, A1_3; separator A2; purification unit/absorber A3; condenser A4; distillation unit A5; separator A6; storage tank A7; reboiler A8; filter A9; carbon dioxide scrub reboilers A10 and A10_1; sub-cooler A11; second sub-cooler A11_1; second reboiler A12; second condenser A13; valve A14; first heat exchanging means A15; expander A16; second heat exchanging means A17, and heat exchanging means A18.

The streams shown in the figures and described below are the following;

Fermentation gas 101; defoamed gaseous stream 102; first, second and third compressed gaseous streams 103, 104, 106; compressed reboiled gas 107; carbon dioxide rich/contaminant lean gaseous stream 108; filtered stream 109; purge gas 110; absorbent stream 111; condensate 111_1; condensed sub-cooled stream 111_2; cool sub-cooled high pressure 111_3; depressurised stream 111_4; purified carbon dioxide 111_5; cooler stream 111_5_1; product stream 111_5_2; re-evaporated stream 111_6; liquid carbon dioxide from the distillation column/liquefied carbon dioxide 112; fraction of liquefied carbon dioxide stream 112_1; evaporated carbon dioxide 112_2; flash gas 113; depressurised liquid 114; stored product stream 116; heated product stream 117; final purge stream 118; expanded product stream 119; gaseous carbon dioxide stream 120; condensed impurities 203; waste contaminant rich stream 204; waste contaminant rich stream 206; reboiled gaseous stream 207; scrubber liquid carbon dioxide stream 208; coolant 301, 401; warm coolant 302, 501; and cooled coolant 402.

Further streams are present in FIG. 1. The nature of these streams will be readily known by the skilled person and need not further detailing.

Now referring to FIGS. 1 and 3 the invention will be described in more details.

The starting gas in the method is a fermentation gas 101 which may be defoamed in a foam trap A0 before being further processed. Defoaming is optional and the necessity depends on the nature of the incoming gas, for example the operation of the fermentors. The defoamed gaseous stream 102 is subjected to a first compression step in the first compressor A1_1. The number of compression steps may be any number from 1 and above. The cost of operation decreases with the number of compressors; however this should be balanced with the cost of acquiring the compressors. In this context the most economical number is three, as embodied in FIGS. 1 and 3. The compression step provides compressed gaseous streams 103, 104 and 106, respectively.

In between the compressors the stream may be subjected to heat exchange where appropriate.

In the embodiment shown a separator A2 is inserted before the third compressor A1_3. This serves to remove condensed impurities 203 primarily water, from the carbon dioxide gas. In general, a separator may be inserted between any of the compression steps, it is within the skill of the art to determine where it will be necessary. The compressed gas 106 is in the embodiment shown routed to a reboiler A8, before entering the purification column A3. Referring to FIG. 1 the hot gaseous stream 106 is then used to evaporate a fraction of the liquefied carbon dioxide stream 112_1 from the distillation column A5 to give evaporated carbon dioxide 112_2, hence facilitating the distillation process. Other energy sources can be used as well.

As previously mentioned due to the difference in pressure between the process and the storage tank, approximately 15-30% of the liquid carbon dioxide will at some point form a flash gas. This flash gas can be used in the distillation column instead of gas generated by for example the reboiler A8.

The at least one compressor A1_1 etc. used may be any suitable compressor. It is preferred that at least one compressor is lubricated, more particularly an oil lubricated screw compressor as this will save on capital and operational costs. When such a compressor is used it is preferred that a filter (not shown) is used before the absorption step, particularly when the absorbent used in the absorption step c) is water. When carbon dioxide is the absorbent, 111, as shown in the embodiment of i.a. FIG. 1, oil residues will be removed, and the presence of a filter will serve as an extra precaution as well as a means for recovery and recycling of the oil to the compressors.

The compressed reboiled gas 107 enters the absorption column A3, preferably in the bottom section thereof. The purification column shown is a carbon dioxide scrubber which is also disclosed in co-pending patent applications WO2009/127217 and PCT/DK2010/050146 hereby incorporated by reference. Thus, the absorption column system comprises in the embodiment shown a scrubber A3 and an optional CO2 scrub reboiler A10. The reboiler A10 serves to minimize the waste contaminant rich stream 204 by re-boiling the scrubber liquid carbon dioxide streams 208 and 206 to provide the reboiled gaseous stream 207 which is purified again in the column.

The absorbent in the purification column is liquid carbon dioxide, preferably drawn from the process further downstream. In the illustrated embodiment the absorbent is the stream 111 taken after the final distillation before depressurization.

It is also contemplated that the carbon dioxide scrubber may be improved according to the solution provided in PCT/DK2010/050146 in which the compressed feed stream is purified in a purification column providing at least a contaminant rich liquid stream and a contaminant lean gaseous stream and reboiling the contaminant rich liquid stream providing a gaseous stream and feeding the gaseous stream to the purification column. A pressure difference between the contaminant rich liquid stream and the contaminant lean gaseous stream is provided before the streams enter the reboiler so that $p_{contaminant\ rich\ liquid\ stream} < p_{contaminant\ lean\ gaseous\ stream}$. More specifically this is obtained by subjecting the compressed stream to a) an absorption step in a column providing a contaminant lean gaseous stream leaving the top section of the column and a contaminant rich liquid stream leaving, optionally the bottom section of, the column and wherein the contaminant lean gaseous stream leaving the top section of the column is further subjected to the steps selected from:

1: b1) compressing the contaminant lean gaseous stream providing a compressed gaseous stream; c1) cooling the compressed gaseous stream in a reboiler providing at least a product stream to be condensed and distilled, and a gaseous stream; and d1) feeding the gaseous stream to the purification column at the bottom section of the column; and 2: b2) cooling the contaminant lean gaseous stream in a reboiler providing at least a product stream to be further condensed and distilled and a gaseous stream; and c2) compressing the gaseous stream providing a cooled compressed gaseous stream; d2) feeding the cooled compressed gaseous stream to the column at the bottom section of the column; and depressurising the contaminant rich liquid stream leaving at the bottom section of the column before entering the reboiler. The depressurisation is in a particular embodiment obtained by means of a valve.

The carbon dioxide scrubber may comprise an integrated water inhibitor or scavenger if necessary. When the starting gas originates from a fermentation process the gas will most likely comprise ethanol, which may serve as the water inhibitor.

This improvement according to PCT/DK2010/0501746 is particularly preferred when the stream comprises many contaminants in order to minimize the waste contaminant rich stream 204. This ensures a high purity as well as a high yield.

After the absorption step, the carbon dioxide rich/contaminant lean gaseous stream 108 is filtered in the filter A9, the filter may be a mechanical filter, activated carbon filter or other type of adsorbent, where appropriate, removing traces of for example $H_2S$. The filter is optional.

Figure 2:
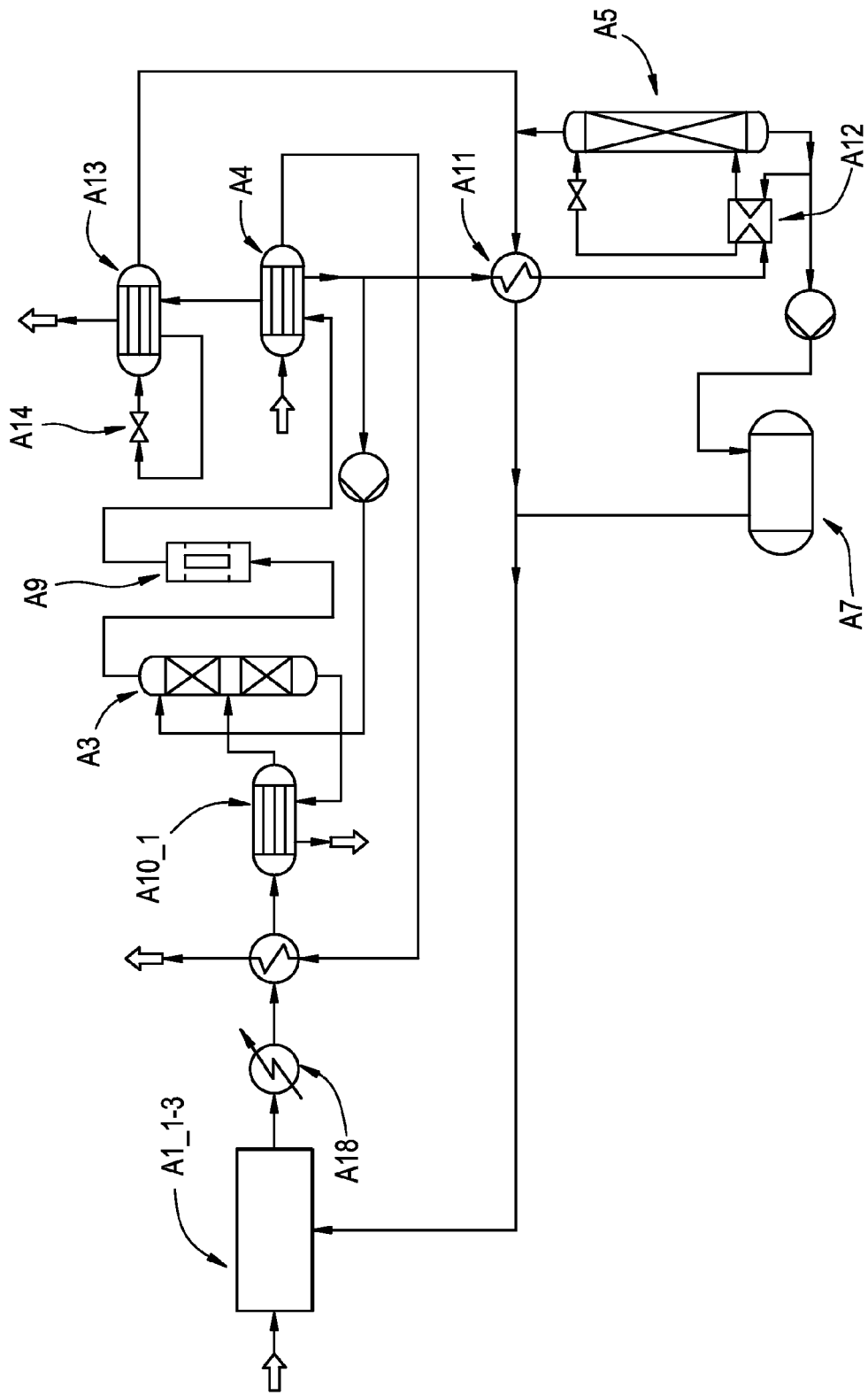
FIG. 2 is a detailed overview of an embodiment of the process according to the invention.
Figure 5:
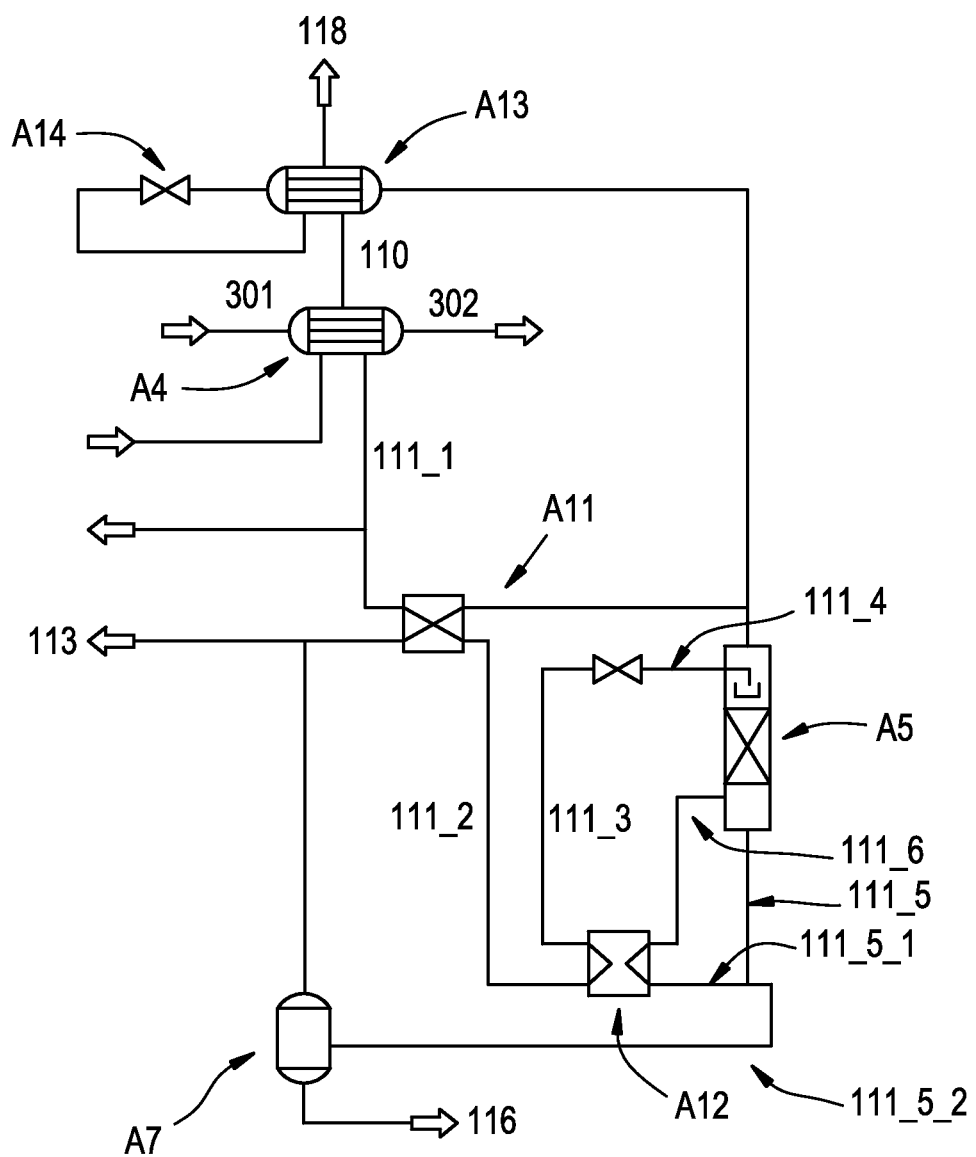
FIG. 5 is a partial view of a process according to the invention wherein distillation is performed under industry standard pressure.

The filtered stream 109 is condensed in the condenser A4. The condenser may be incorporated in the distillation column A5, as embodied in FIG. 1. It is also contemplated that the units are separate as illustrated in FIGS. 2, 3 and 5. The condensation is performed by the coolant 301, providing a warmer coolant 302. The coolant is any fluid having a cooling effect sufficient to condense the carbon dioxide at the high pressures contemplated. Particularly preferred is a coolant present in the brewery, or bottlery for example brine typically having a temperature between −5° C. and +5° C., such as −2 or −3° C., used for example for cooling the fermentation tanks. Thereby the condensation is obtained without any external supply of energy or without adding further equipment to the plant. In a particularly preferred embodiment (not shown) liquefied carbon dioxide is taken from the storage tank A7 and is re-evaporated using the incoming coolant 301. In this embodiment the liquefied carbon dioxide is preferably taken from the storage tank, and the coolant is cooled, by means of the evaporating carbon dioxide, to a lower temperature before entering the condenser A4. After leaving the condenser A4 the temperature of the warmer coolant 302 could be returned to the temperature as initially supplied. Consequently, the condensation process is completely energy neutral which is of great economic advance over the prior art.

Figure 3:
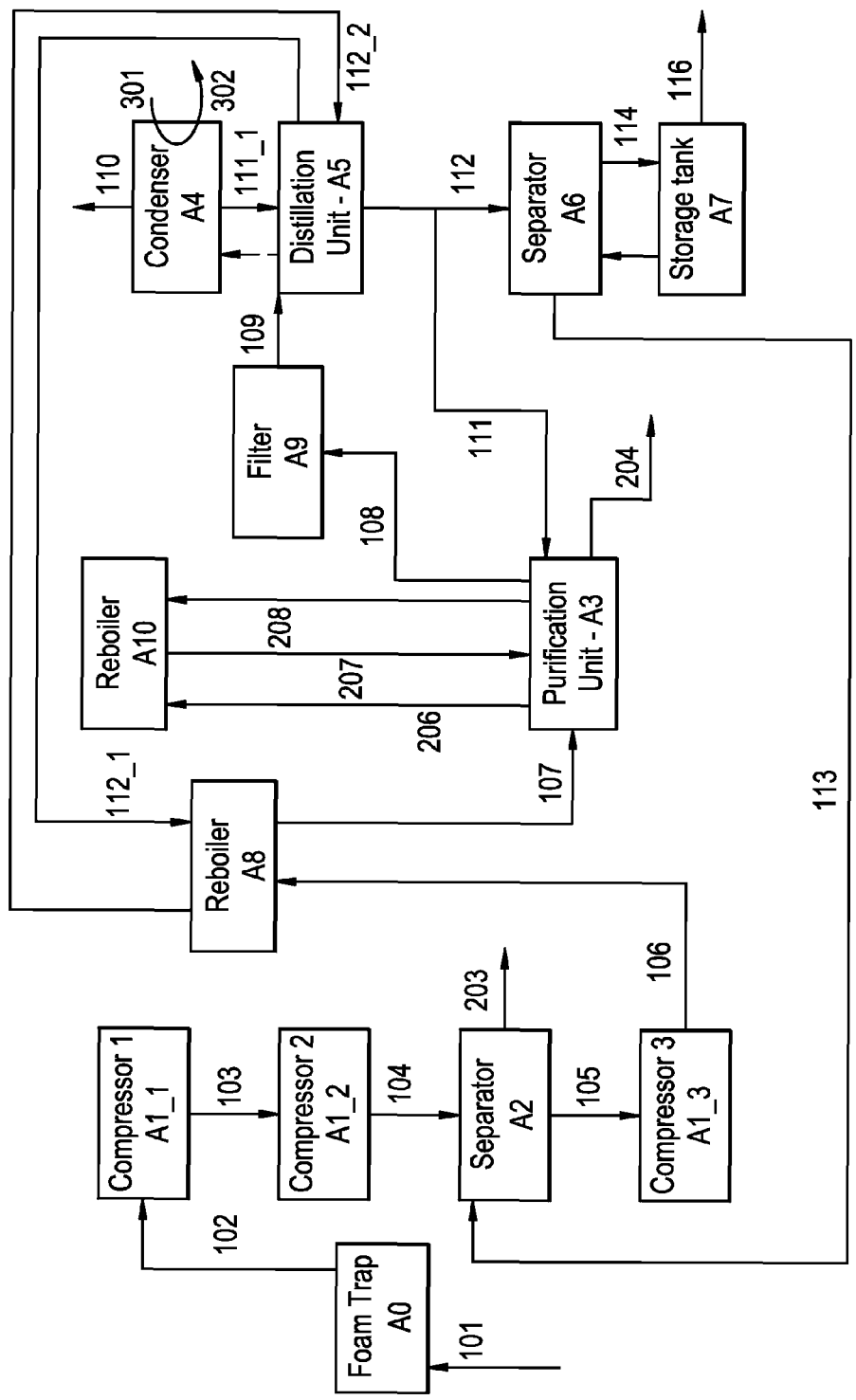
FIG. 3 is a simplified schematic overview of the embodiments of FIGS. 1 and 2.

After condensation, the condensate 111_1 is distilled to further purify the carbon dioxide which provides the liquefied carbon dioxide stream 112, it is contemplated that gaseous carbon dioxide arises from the distillation unit to i.a. the condensation unit as will appear from FIGS. 1 and 3. A portion of the liquefied carbon dioxide stream 112 may be taken as the absorbent 111 when liquid carbon dioxide is used as the absorbent in the absorption step.

In FIG. 2 another embodiment of the process according to the invention is shown. The reference signs of FIGS. 1 and 3 also apply to FIG. 2. The downstream processes in the embodiment of FIG. 2 are detailed in FIG. 5. Thus, reference is made to both FIGS. 1, 3 and 5. A variation of the CO2scrub reboiler, A10_1, is shown in FIG. 2. In this embodiment the CO2scrub reboiler A10_1 is connected to the stream leaving the last compressing means before entering the absorption column A3.

Figure 4:
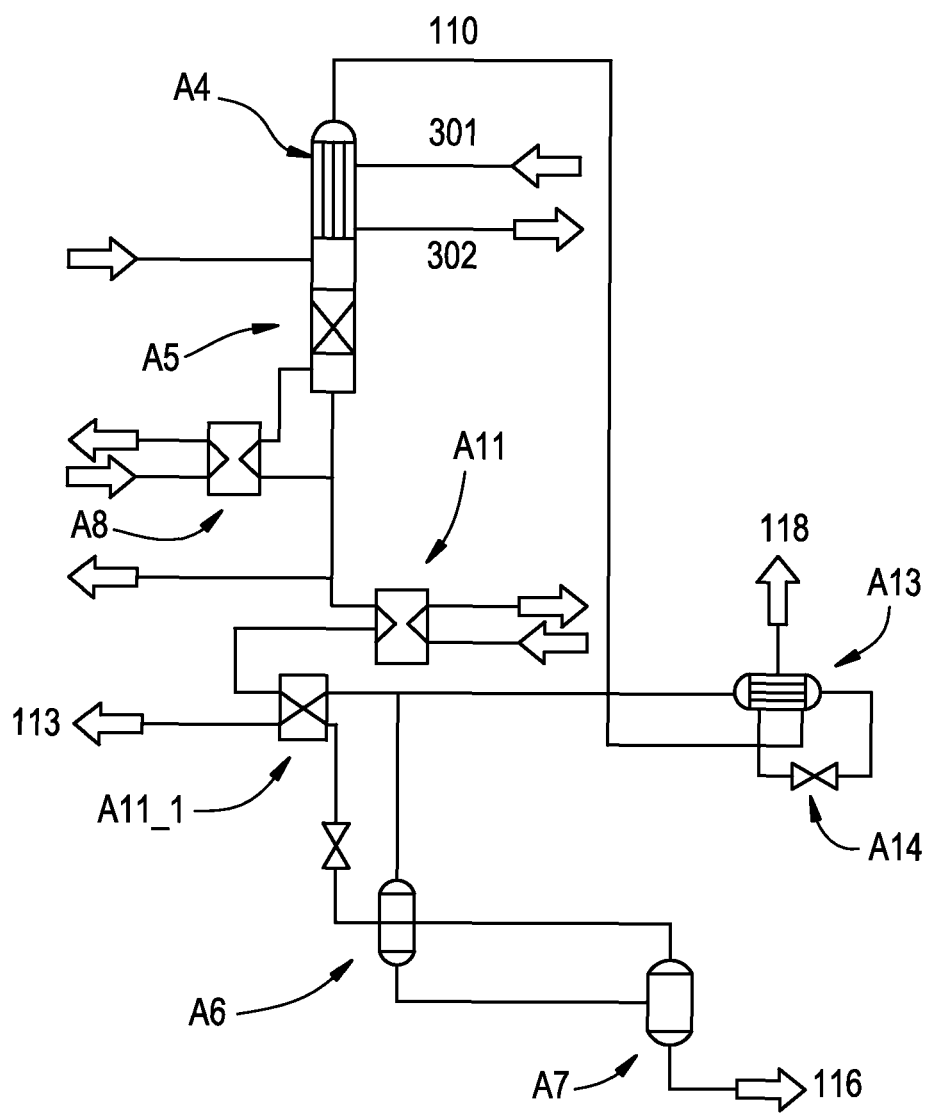
FIG. 4 is a partial view of a process according to the invention wherein distillation is performed under high pressure.

In the embodiment shown in FIG. 4, which is a detailed view of the downstream processes of the embodiment shown in FIG. 1, the liquefied carbon dioxide stream 112 is depressurized whereby a certain amount of flash gas is created. Before the liquefaction the stream is, optionally, sub-cooled once or twice (shown) by means of sub-coolers A11 and A11_1, the sub-coolers may be driven by means of brine or carbon dioxide or both whichever is appropriate for the particular stream being cooled. The proportion of flash gas depends on the difference in pressure. In a typical embodiment where the pressure is reduced from 35 to 16 bar, 16 bar being the industry standard for carbon dioxide storage tanks, the amount of flash gas is 20% of the total stream. Liquid and gas are separated in the separator A6 providing the depressurized liquid 114 for storage in the storage tank A7. The separator A6, for example a flash distillation column, also provides the flash gas 113. This flash gas 113 is, in the embodiment shown, returned to a position before the final compression stage, for purification again. Alternatively, another compressor may be present between the separator A6 and the condenser A4 whereby the flash gas 113 may be condensed and distilled again.

In the embodiment shown in FIG. 5 the condensate 111_1 is depressurized before distillation. The condensate 111_1 may in the embodiment shown, have a pressure of 47 bar. The condensate 111_1 may in a preferred embodiment pass a sub-cooler, A11_1 The purpose of adding a sub-cooler is to minimize the amount of the flash gas 113 recycled to the compression and purification step. Thus the sub-cooling reduces the overall energy consumption. The sub-cooling may also be added for technical reasons to protect the equipment, such as avoiding freezing if water is present in the compressed gaseous stream 104 of i.a. FIG. 1.

After the, optional, sub-cooling, the condensed sub-cooled stream 111_2, is passed through a second reboiler, A12, providing the cool sub-cooled high pressure stream 111_3. The pressure of the stream 111_3 is then reduced, for example from 47 bar to 16 bar, to the depressurized stream 111_4 whereby a substantial amount of the stream evaporates and provides a flash gas which is usable in the distillation step e) in the distillation column A5.

In a saturated stream (i.e. +12° C.) approximately 30% of the incoming stream will evaporate to form a flash gas when reducing the pressure. When the condensed sub-cooled stream 111_2 is sub-cooled to +1° C. the portion will be approximately 20%, if further sub-cooled to −11° C. the portion will be approximately 12%.

In this setup, the reduction of the pressure results in the flash gas being formed, the flash gas can be used in the final distillation step (step e).

First, the condensed sub-cooled stream 111_2 enters the reboiler A12. This condensed sub-cooled stream 111_2 is warmer than an incoming cooler stream 111_5_1 being at a lower pressure, typically the liquid carbon dioxide taken from the bottom section of the distillation column A5 in the embodiment shown. The heat of the condensed sub-cooled stream 111_2 is transferred to the cooler stream 111_5_1 to give the re-evaporated stream 111_6 entering the distillation column again. The now cooler sub-cooled high pressure stream 111_3 is then subjected to a reduction in pressure whereby the even cooler mixed phase depressurized stream 111_4 is provided. The depressurized stream 111_4 enters the distillation column A5 where the liquid fraction is purified by the countercurrent re-evaporated gaseous stream 111_6 providing the purified liquid carbon dioxide 111_5. The purified liquid carbon dioxide 111_5 is split in two fractions 111_5_1 (the cooler stream), and 111_5_2 (the product) of which 111_5_1 is fed to the reboiler A12 and 111_5_2 is the product.

Thereby the distillation step is energy neutral because there is no need for external supply of heat or cold.

Compared to the embodiment shown in FIG. 4 the heat supplied to the reboiler A8 originating from the process upstream as shown in FIG. 3 (and FIGS. 1 and 2), is not necessary.

Instead, in the embodiment shown in FIG. 5 it may be beneficial to include an additional heat exchanging step by means of a heat exchanger A18, at a position after the last compressor A1_3 in order to extract heat from the system. This will minimize the amount of brine used further downstream in the process in the condenser A4 where carbon dioxide is liquefied.

This heat extraction is effectuated by means of a heat exchanger using cooling water or air. When inserting the heat exchanger after the compression step b), this embodiment utilizes less power than the embodiment of FIG. 1 as stream 106 is cooled by e.g. air or cooling water instead of brine.

In another preferred embodiment (shown in both FIGS. 4 and 5) a second heat exchanging step combined with a re-evaporation step is inserted after the condensing step d). This embodiment is beneficial in both the high and low pressure distillation embodiment of FIGS. 4 and 5, respectively.

In this particular embodiment the purge gas 110 (gaseous carbon dioxide stream) leaving the condenser A4 is passed to a second condenser A13 connected to a loop with a valve A14 or similar means for reducing the pressure of the purge gas 110, for example from 47 to 16 bar similar to the depressurization described for the embodiment illustrated in FIG. 5. This depressurization also results in a mixed phase stream comprising up to 30% flash gas. The reduction in pressure entails a reduction of the temperature of approximately 30%, in this embodiment from −34° C. to −44° C. due to the content of non-condensable gases.

The stream being cooled to −44° C. entails that less carbon dioxide is present in the final purge stream 118. Thus, the result of inserting this additional condensing step of the purge gas 110 coming from the first condensing step d) is that the amount of carbon dioxide discarded with the final purge stream 118 is markedly reduced, i.e. from 1300 kg/h to 190 kg/h for the example illustrated. Hence, the overall yield of carbon dioxide is increased.

It is also contemplated in a preferred embodiment that the flash gas 113 is used directly in the brewery production line as cover gas or for carbonating the beverages.

Finally, it is contemplated that the gas is condensed using the cooling effect from the re-evaporation of the liquid carbon dioxide.

The stored liquefied carbon dioxide may be taken from the storage tank as stored stream 116 and re-evaporated for use in the brewery. For re-evaporation the coolant 301 is preferably used before entering the condenser A4 as detailed above.

It is also contemplated that heat exchangers, pumps, valves etc. are present where appropriate in order to start and maintain the desired pressure, temperature and other parameters throughout the method. Such provisions are within the skill of the art.

Figure 6:
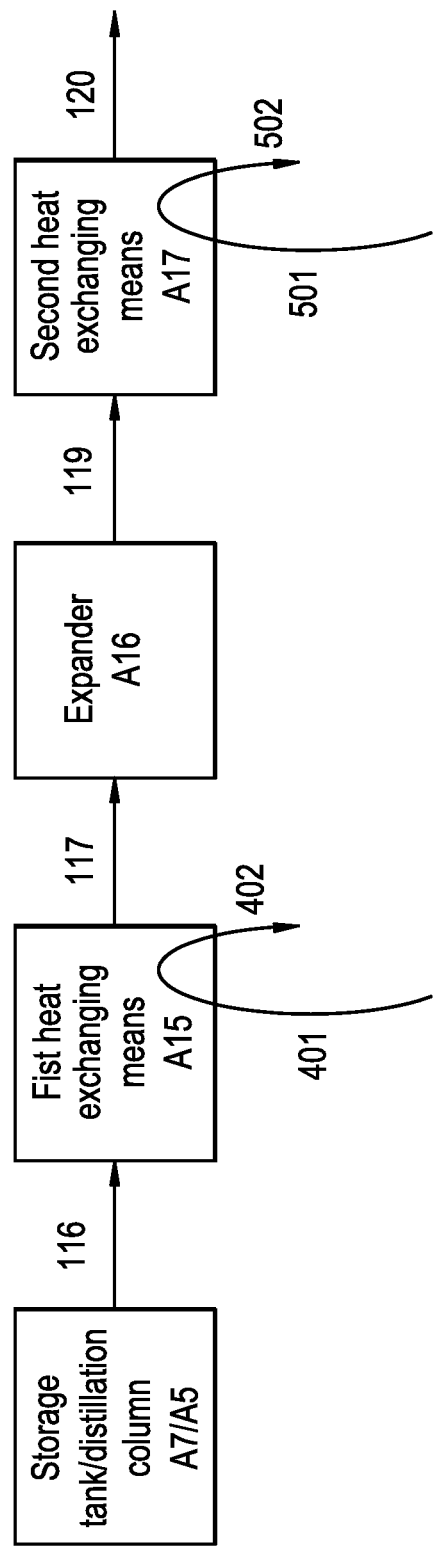
FIG. 6 is a particular embodiment for re-evaporating liquid carbon dioxide.

Now referring to FIG. 6, another particular aspect and embodiment of the invention will be described in further details.

At the time of i.a. carbonating the beverages in the brewery, liquefied carbon dioxide may be taken from the storage tank A7 or directly from the distillation step e) as for example the flash gas 113.

The liquefied carbon dioxide 116 from the tank or distillation column having a temperature typically in the range $-30°$ C. to $20°$ C. and a pressure typically in the range 10 to 55 bar will in the embodiment be re-evaporated by use of a first heat exchanging means A15, preferably an evaporator, by contacting the liquefied carbon dioxide stream 116 with a coolant 401, e.g. brine, taken from the brewery.

Hereby the temperature of the coolant 401 decreases from e.g. $-5°$ C. to $-8°$ C., and the temperature of the heated product stream 117 leaving the first heat exchanging means A5 may increase to for example $-6°$ C. A temperature of $25°$ C. may be obtained by two or more heat exchanging steps where the second and additional steps are typically not effectuated by using brine, but water, air or any other warmer media (not shown). The resulting coolant 402 is in a particularly preferred embodiment used as the coolant (301 in the process of FIG. 1 as the condensing means A4 of FIG. 1), whereby the temperature of the coolant will increase typically to the initial temperature of the brine, i.e. $-5°$ C. and can be used again in the brewery as such.

Further, the warmer now gaseous heated product stream 117 is then expanded by means of an expander A16. The temperature and pressure of the expanded product stream 119 may be from $-55$ to $-20°$ C. and 5-7 bar, respectively. The expanded product stream 119 is heated by use of a second heat exchanging means A17.

In the second heat exchanging means A17 the heating is in a particular embodiment effectuated by using a warmer coolant 501, such as the warmer coolant 302 of FIG. 1. Thus, the warmer coolant 302/501 may have the same origin as the coolant used for the first heat exchanging means A15, the warm coolant (302 of FIG. 1) leaving the condenser A4, or may be taken directly from a coolant storage tank (not shown). The expansion and respective heating steps can be performed in one or more steps.

The cooling power obtained may be used for example in the condenser A4.

The gaseous carbon dioxide stream 120 leaving the second heat exchanging means A17 could have a temperature of approximately 5-25° C. and a pressure of 1-6 bar and may be used in the distillery/bottlery etc. as such.

By use of the first and second heat exchanging means (A15 and A17) between 90 and 115 kWh cold energy per ton carbon dioxide may be recovered. Furthermore, by use of the expander A16 additionally 10 to 20 kW power may be recovered compared to a conventional process using a valve and heat exchanger. The recovered power may either be used for compression work elsewhere in the carbon dioxide recovery process, in the brewery or elsewhere.

It is also contemplated that this latter aspect and/or embodiment is implemented at any site where liquefied carbon dioxide is being re-evaporated for use and it should not be restricted to the method of the invention.

What is claimed is:

1. A method for recovering carbon dioxide from a gaseous carbon dioxide stream originating from a fermentation process, brewery or a bottling line, the method comprises the steps of:
    a) providing the carbon dioxide stream originating from the fermentation process, brewery or bottling line;
    b) compressing the provided carbon dioxide stream by at least one compression step providing a compressed gaseous stream;
    c) subjecting the compressed gaseous stream to an absorption step providing at least a carbon dioxide rich gaseous stream, wherein the absorption step comprises liquid carbon dioxide as an absorbent;
    d) condensing the carbon dioxide rich gaseous stream in a condenser providing at least a condensate and a purge gas; and
    e) distilling the liquid carbon dioxide stream to provide purified carbon dioxide, wherein the pressure of the compressed gaseous stream obtained in step b) is at least 30 bar, the temperature is within a range where there is substantially no condensation of carbon dioxide and that said pressure is maintained to at least step d),
    wherein the condensation of step d) is performed by a coolant used in the brewery, fermentation process or bottling line, the coolant comprising a brine, the brine being an aqueous mixture which lowers a freezing point of water.

2. A method according to claim 1 further comprising the step of transferring the condensed, distilled carbon dioxide to a storage tank having a pressure that is lower than the condensation pressure of step d), whereby a second gaseous stream is formed and wherein said second gaseous stream is further processed.

3. A method according to claim 2, wherein the further processing is selected from: transferring as a product to a beverage production plant, condensing and transferring to a storage tank, and feeding to the compression step b) or the distillation step e).

4. A method according to claim 1 wherein the brine comprises glycol and salt.

5. A method according to claim 1, wherein the condensed, distilled carbon dioxide is re-evaporated by the coolant.

6. A method according to claim 1, wherein the at least one compression step is performed by means of a lubricated compressor.

7. A method according to claim 6 wherein the lubricated compressor is an oil lubricated screw compressor.

8. A method according to claim 1 comprising 2 or 3 compression steps.

9. A method according to claim 1, wherein the compressed gaseous stream is filtered before the condensation of step d.

10. A method according to claim 1 wherein the pressure is reduced after the condensing step d) and the distillation of step e) is performed at the reduced pressure.

11. A method according to claim 10, wherein the reduced pressure is a standard pressure applied in the industry for storage of carbon dioxide.

12. A method according to claim 10, wherein the reduced pressure is in the range of 15 to 18 bar.

13. A method according to claim 10, wherein the reduced pressure is approximately 16 bar.

14. A method according to claim 1 further comprising a step f) of subjecting the purge gas obtained in step d) to a combined condensing and re-evaporation step, wherein the re-evaporation step is performed at a lower pressure than the pressure of the purge gas obtained in step d).

15. A method according to claim 14 wherein the re-evaporation step is performed at a standard pressure applied in the industry for storage of carbon dioxide.

16. A method according to claim 14 wherein the re-evaporation step is performed at a pressure in the range of 15 to 18 bar.

17. A method according to claim 14 wherein the re-evaporation step is performed at approximately 16 bar.

18. A method according to claim 14, wherein the pressure is reduced by means of a valve.

19. A method according to claim 1, wherein the distilled carbon dioxide is stored in a carbon dioxide storage tank.

20. A method according to claim 1, wherein carbon dioxide obtained is re-evaporated to provide a gaseous carbon dioxide stream for use in a production in need of gaseous carbon dioxide, the method comprising the steps of:

f) providing liquid carbon dioxide from the distillation unit of step e) or from the condensation of step d);

g) evaporating the liquid carbon dioxide in a heat exchanging means to provide a gaseous heated carbon dioxide steam;

h) expanding the gaseous heated carbon dioxide stream to provide an expanded gaseous heated carbon dioxide stream; and i) heating the expanded gaseous heated carbon dioxide stream to provide a gaseous carbon dioxide stream for use in a production in need of gaseous carbon dioxide.

21. A method according to claim 20, wherein produced cold from the expansion is recovered and/or electricity or mechanical work is generated by the expand.

22. A method according to claim 1, wherein the condensed, distilled carbon dioxide is re-evaporated by the coolant before the condensing step d).

23. A method according to claim 1, wherein the compressed gaseous stream is filtered before the condensation of step d) by means of a mechanical and/or adsorption filter.

\* \* \* \* \*